United States Patent
Kwon et al.

(10) Patent No.: US 12,107,305 B2
(45) Date of Patent: Oct. 1, 2024

(54) POWER GENERATION CONTROL SYSTEM AND METHOD OF A FUEL CELL

(71) Applicants: HYUNDAI MOTOR COMPANY, Seoul (KR); KIA CORPORATION, Seoul (KR)

(72) Inventors: Soon Woo Kwon, Yongin-si (KR); Dae Jong Kim, Yongin-si (KR)

(73) Assignees: HUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 465 days.

(21) Appl. No.: 17/511,279

(22) Filed: Oct. 26, 2021

(65) Prior Publication Data

US 2022/0140372 A1 May 5, 2022

(30) Foreign Application Priority Data

Nov. 3, 2020 (KR) .................. 10-2020-0145377

(51) Int. Cl.
*H01M 8/04858* (2016.01)
*H01M 8/04746* (2016.01)

(52) U.S. Cl.
CPC ... *H01M 8/04873* (2013.01); *H01M 8/04753* (2013.01)

(58) Field of Classification Search
None
See application file for complete search history.

(56) References Cited

U.S. PATENT DOCUMENTS

| 2011/0190959 A1* | 8/2011 | Manabe | H01M 16/006 700/298 |
| 2012/0288778 A1* | 11/2012 | Kazuno | H01M 8/04753 429/432 |
| 2013/0059220 A1* | 3/2013 | Kim | H01M 8/04992 429/432 |

FOREIGN PATENT DOCUMENTS

KR 20100060478 A 6/2010

* cited by examiner

*Primary Examiner* — Carlos Barcena
(74) *Attorney, Agent, or Firm* — Lempia Summerfield Katz LLC (57) ABSTRACT

A power generation control system of a fuel cell includes: the fuel cell generating a power through a chemical reaction between fuel and air; a consuming device connected to an output terminal of the fuel cell and consuming the power output from the fuel cell; a converter connected between the fuel cell and the consuming device in series or parallel and adjusting an output voltage of the fuel cell; a supply device supplying the air to the fuel cell; a voltage controller controlling the converter on the basis of a required power or current of the fuel cell required to be output; and a supply controller controlling the supply device on the basis of the required power or current of the fuel cell required to be output.

14 Claims, 6 Drawing Sheets

PERFORMANCE CURVE I

POWER GENERATION CONTROL SYSTEM AND METHOD OF A FUEL CELL

CROSS REFERENCE TO RELATED APPLICATION

The present application claims priority to Korean Patent Application No. 10-2020-0145377, filed Nov. 3, 2020, the entire contents of which are incorporated herein for all purposes by this reference.

BACKGROUND

1. Technical Field

The present disclosure relates to a power generation control system and method of a fuel cell, and more particularly, to power generation control that follows a required power or a required current of a fuel cell.

2. Description of the Related Art

A fuel cell is a cell directly converting chemical energy generated by oxidation of fuel into electrical energy and is a kind of power generation device. The fuel cell is the same as a chemical cell in that it basically uses oxidation and reduction reactions. However, the fuel cell is different from the chemical cell in which a cell reaction is performed in a closed system in that reactants are continuously supplied from the outside and reaction products are continuously removed to the outside of the system. Recently, a fuel cell power generation system has been put into practical use. Since a reaction product of the fuel cell is pure water, research for using the fuel cell power generation system as an energy source of an eco-friendly vehicle has been actively conducted.

The fuel cell power generation system includes a fuel cell stack generating electrical energy through a chemical reaction, an air supply device supplying air to a cathode of the fuel cell stack, and a hydrogen supply device supplying hydrogen to an anode of the fuel cell stack. In other words, air including oxygen is supplied to the cathode of the fuel cell stack and hydrogen is supplied to the anode of the fuel cell stack.

The contents described as the related art have been provided only to assist in understanding the background of the present disclosure and should not be considered as corresponding to the related art known to those having ordinary skill in the art.

SUMMARY

An object of the present disclosure is to provide a technology of controlling power generation of a fuel cell according to a load region in which the fuel cell is operated so that durability of the fuel cell is maintained.

According to an embodiment of the present disclosure, a power generation control system of a fuel cell includes the fuel cell generating a power through a chemical reaction between fuel and air. The system also includes a consuming device connected to an output terminal of the fuel cell and consuming the power output from the fuel cell. The system also includes a converter connected between the fuel cell and the consuming device in series or parallel and adjusting an output voltage of the fuel cell. The system also includes a supply device supplying the air to the fuel cell. The system also includes a voltage controller controlling the converter on the basis of a required power or current of the fuel cell required to be output. The system also includes a supply controller controlling the supply device on the basis of the required power or current of the fuel cell required to be output.

The power generation control system of a fuel cell may further include a high voltage battery connected between the fuel cell and the consuming device in parallel on a side opposite to the fuel cell with respect to the converter and charged with the power generated by the fuel cell or assisting the power generated by the fuel cell while being discharged.

The voltage controller may divide a load region of the fuel cell into a first region and a second region on the basis of a ratio of an amount of supplied air to an amount of reacting air in the fuel cell and may control the converter on the basis of the divided load region.

The voltage controller may maintain the output voltage of the fuel cell at a preset voltage in the first region in which a load is relatively low.

The voltage controller may perform proportional integral control on the output voltage of the fuel cell so that an output power of the fuel cell follows the required power on the basis of a difference between the required power and the output power of the fuel cell in the second region where a load is relatively high.

The supply controller may divide a load region of the fuel cell into a first region and a second region on the basis of the output voltage of the fuel cell and may control the supply device on the basis of the divided load region.

The supply controller may perform proportional integral control on an amount of supplied air so that an output current of the fuel cell follows the required current on the basis of a difference between the required current and the output current of the fuel cell in the first region where a load is relatively low.

The supply controller may control the supply device so that a ratio of an amount of supplied air to an amount of reacting air in the fuel cell decreases as the required current decreases in the first region in which a load is relatively low.

The supply controller may maintain a ratio of an amount of supplied air to an amount of reacting air in the fuel cell in a preset ratio in the second region where a load is relatively high.

The voltage controller or the supply controller may reset an integral value according to the difference between the required power and the output power of the fuel cell or a difference between the required current and the output current of the fuel cell at the time of a transition of the load region.

According to another embodiment of the present disclosure, a power generation control method of a fuel cell includes receiving a required power or current of the fuel cell required to be output. The method also includes setting an output voltage of the fuel cell or an amount of air supplied to the fuel cell on the basis of the received required power or current. The method also includes controlling a converter connected between the fuel cell and a consuming device in series or parallel on the basis of the set output voltage of the fuel cell or controlling a supply device supplying the air to the fuel cell on the basis of the set amount of supplied air.

The power generation control method of a fuel cell may further include, before the setting of the output voltage of the fuel cell or a ratio of the amount of air supplied to the fuel cell, dividing a load region into a first region and a second region on the basis of the output voltage of the fuel cell or the amount of supplied air compared to an amount of reacting air in the fuel cell. In the setting of the output voltage of the fuel cell or the amount of air supplied to the fuel cell, the output voltage of the fuel cell or the amount of air supplied to the fuel cell is set on the basis of the divided load region.

The setting of the output voltage of the fuel cell or the amount of air supplied to the fuel cell may include maintaining the output voltage of the fuel cell at a preset voltage in the first region where a load is relatively low. The setting of the output voltage of the fuel cell or the amount of air supplied to the fuel cell may also include setting the output voltage of the fuel cell by performing proportional integral control on the output voltage of the fuel cell so that an output power of the fuel cell follows the required power on the basis of a difference between the required power and the output power of the fuel cell in the second region where the load is relatively high.

The setting of the output voltage of the fuel cell or the amount of air supplied to the fuel cell may include performing proportional integral control on the amount of supplied air so that an output current of the fuel cell follows the required current on the basis of a difference between the required current and the output current of the fuel cell in the first region where a load is relatively low. The setting of the output voltage of the fuel cell or the amount of air supplied to the fuel cell may include setting the amount of supplied air so that the ratio of the amount of supplied air to an amount of reacting air in the fuel cell decreases as the required current decreases in the first region where the load is relatively low.

In the setting of the output voltage of the fuel cell or the amount of air supplied to the fuel cell, an integral value according to a difference between the required power and an output power of the fuel cell or a difference between the required current and an output current of the fuel cell at the time of a transition of the load region may be reset.

DETAILED DESCRIPTION OF THE EMBODIMENTS

Specific structural and functional descriptions are provided only in order to describe embodiments of the present disclosure disclosed in the present specification or application. Therefore, embodiments of the present disclosure may be implemented in various forms. The present disclosure should not be interpreted as being limited to the embodiments described in the present specification or application.

Since embodiments of the present disclosure may be variously modified and may have several forms, specific embodiments are illustrated in the accompanying drawings and are described in detail in the present specification or application. However, it should be understood that the present disclosure is not limited to the specific embodiments, but includes all modifications, equivalents, and substitutions falling within the spirit and the scope of the present disclosure.

Terms such as 'first' and/or 'second' may be used to describe various components, but these components should not be construed as being limited to these terms. The terms are used only to distinguish one component from another component. For example, a 'first' component may be referred to as a 'second' component and a 'second' component may be similarly referred to as a 'first' component, without departing from the scope of the present disclosure.

It should be understood that, when one component is referred to as being "connected to" or "coupled to" another component, one component may be connected directly to or coupled directly to another component or may be connected to or coupled to another component with the other component interposed therebetween. On the other hand, it should be understood that, when one component is referred to as being "connected directly to" or "coupled directly to" another component, it may be connected to or coupled to another component without the other component interposed therebetween. Other expressions describing a relationship between components, i.e., "between", "directly between", "neighboring to", "neighboring directly to", and the like, should be similarly interpreted.

Terms used in the present specification are used only in order to describe specific embodiments rather than limiting the present disclosure. Singular forms are intended to include plural forms unless the context clearly indicates otherwise. It should be understood that the terms "include" or "have" used in the present specification specify the presence of stated features, numerals, steps, operations, components, parts, or combinations thereof, but do not preclude the presence or addition of one or more other features, numerals, steps, operations, components, parts, or combinations thereof.

Unless indicated otherwise, it should be understood that all the terms used herein including technical and scientific terms have the same meaning as those generally understood by those having ordinary skill in the art to which the present disclosure pertains. Terms defined by a generally used dictionary should be interpreted as having meanings consistent with meanings within a context of the related art. These terms should not be interpreted as having ideal or excessively formal meanings unless explicitly defined in the present specification.

Hereinafter, embodiments of the present disclosure are described in detail with reference to the accompanying drawings. The same reference numerals in each drawing denote the same or equivalent components. When a component, device, element, or the like of the present disclosure is described as having a purpose or performing an operation, function, or the like, the component, device, or element should be considered herein as being "configured to" meet that purpose or to perform that operation or function.

Figure 1:
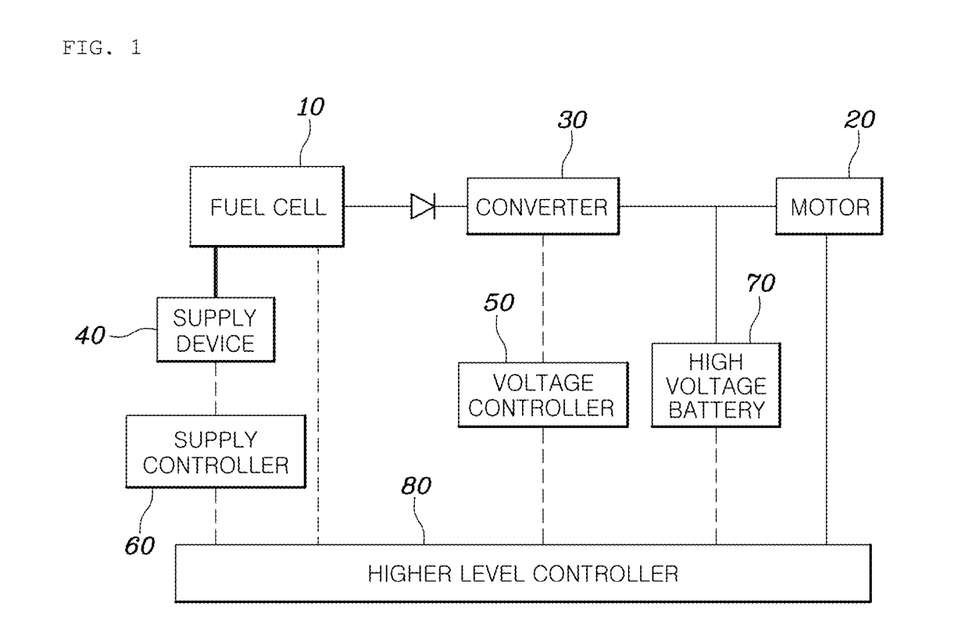
FIG. 1 is a view illustrating a configuration of a power generation control system of a fuel cell according to an embodiment of the present disclosure.

FIG. 1 is a view illustrating a configuration of a power generation control system of a fuel cell 10 according to an embodiment of the present disclosure.

Referring to FIG. 1, the power generation control system of a fuel cell 10 according to an embodiment of the present disclosure includes the fuel cell 10 generating a power through a chemical reaction between fuel and air. The system also includes a consuming device 20 connected to an output terminal of the fuel cell 10 and consuming the power output from the fuel cell 10. The system also includes a converter 30 connected between the fuel cell 10 and the consuming device 20 in series or parallel and adjusting an output voltage of the fuel cell 10. The system also includes a supply device 40 supplying the air to the fuel cell 10. The system also includes a voltage controller 50 controlling the converter 30 on the basis of a required power or current of the fuel cell 10 required to be output. The system also includes a supply controller 60 controlling the supply device 40 on the basis of the required power or current of the fuel cell 10 required to be output.

The voltage controller 50 and the supply controller 60 according to an embodiment of the present disclosure may be implemented through a non-volatile memory (not illustrated) configured to store data on an algorithm configured to control operations of various components of a vehicle or software instructions reproducing the algorithm. The voltage controller 50 and the supply controller 60 may be also implemented though a processor (not illustrated) configured to perform operations that are described below using the data stored in the non-volatile memory. Here, the memory and the processor may be implemented as individual chips. Alternatively, the memory and the processor may be integrated with each other and implemented as a single chip. The processor may have a form of one or more processors.

The fuel cell 10 may be a fuel cell stack 10 generating power through a chemical reaction by receiving air including hydrogen, which is fuel, and oxygen, at an anode and a cathode.

In an embodiment, the fuel cell stack 10 may include a plurality of unit cells that are stacked, generate power by fuel and air introduced into each of the unit cells, and output power of a high voltage by the unit cells connected to each other in series.

The consuming device 20 may be a power device consuming the power supplied from the fuel cell 10 or a high voltage battery 70. In an embodiment, a required power of the consuming device 20 may be varied in real time.

In an embodiment, the power generation control system of a fuel cell 10 according to the present disclosure may be mounted on a fuel cell vehicle. All or some of power devices consuming the power in the fuel cell vehicle may be included in the consuming device 20.

The consuming device 20 may include accessories such as a driving motor driving the fuel cell vehicle, the supply device 40 supplying the air for power generation of the fuel cell 10, and the like.

The converter 30 may be positioned at a main bus terminal connecting the fuel cell 10 and the consuming device 20 to each other. In an embodiment, the converter 30 may be connected to the main bus terminal between the fuel cell 10 and the consuming device 20 in series.

In another embodiment, the converter 30 may be connected to the main bus terminal in parallel while being connected to a high voltage battery 70 in series.

The supply device 40 may be a device supplying the air to the fuel cell 10 while being driven by the supplied power. In an embodiment, the supply device 40 may include an air compressor or a blower, a pressure adjusting valve, and the like.

The voltage controller 50 may adjust an output voltage of the fuel cell 10 by controlling the converter 30. In an embodiment, the voltage controller 50 may control the output voltage of the fuel cell 10 on the basis of a required power or current of the fuel cell 10 required to be output.

In addition, the supply controller 60 may adjust an amount of air supplied to the fuel cell 10 by controlling the supply device 40. In an embodiment, the supply controller 60 may control the amount of supplied air on the basis of the required power or current of the fuel cell 10 required to be output.

Therefore, the power generation of the fuel cell 10 is controlled according to the required power or current of the fuel cell 10 required to be output. Excessive supply of the air to the fuel cell 10 is prevented and a voltage of the fuel cell 10 is maintained to improve durability of the fuel cell 10.

In an embodiment, a frequency of entry into a fuel cell (FC) stop mode of the fuel cell 10 decreases, such that the durability of the fuel cell 10 may be improved. The output voltage of the fuel cell 10 may be maintained at a preset voltage or less even at the time of overcharging, high temperature, or low temperature of the high voltage battery 70.

The power generation control system of a fuel cell 10 may further include a high voltage battery 70 connected between the fuel cell 10 and the consuming device 20 in parallel on a side opposite to the fuel cell 10 with respect to the converter 30 and charged with the power generated by the fuel cell 10 or assisting the power generated by the fuel cell 10 while being discharged.

Specifically, the power generated and output from the fuel cell 10 may be supplied to the high voltage battery 70 and the consuming device 20 through the converter 30. The power supplied to the high voltage battery 70 may be positive or negative. In a case where the power supplied to the high voltage battery 70 is negative, the high voltage battery 70 may assist the power supplied from the fuel cell 10 to the consuming device 20 while being discharged.

The high voltage battery 70 may be charged with the power supplied from the fuel cell 10 or may assist the power generated by the fuel cell 10 while being discharged. In an embodiment, the high voltage battery 70 may assist the fuel cell 10 while being discharged to supply the power to the consuming device 20 so that the consuming device 20 consume the powers and may be charged in a case where excess power of the power generated by the fuel cell 10 is generated.

In an embodiment, the power generation control system of a fuel cell 10 may further include a higher level controller 80 calculating the required power or current of the fuel cell 10 required to be output on the basis of a state of the fuel cell 10, a state of charge of the high voltage battery 70, a required power of the consuming device 20, and the like.

In an embodiment, the higher level controller 80 may calculate the required power of the fuel cell 10 required to be output by a pre-stored three-dimensional map regarding the required power of the fuel cell 10 required to be output according to the required power of the consuming device 20 and the state of charge of the high voltage battery 70.

Figure 2:
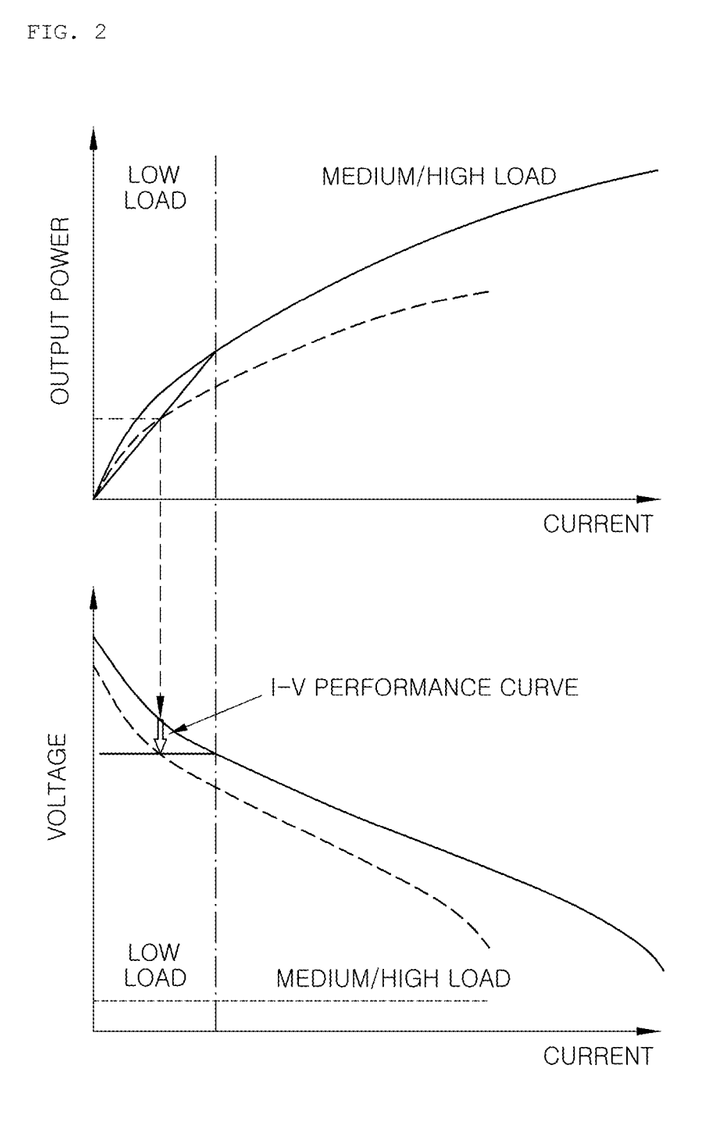
FIG. 2 are graphs of an output power and an output voltage according to an output current of a fuel cell according to an embodiment of the present disclosure.

FIG. 2 are graphs of an output power and an output voltage according to an output current of a fuel cell 10 according to an embodiment of the present disclosure.

Further referring to FIG. 2, the voltage controller 50 may divide a load region of the fuel cell 10 into a first region and a second region on the basis of a ratio of an amount of supplied air to an amount of reacting air in the fuel cell 10. The voltage controller 50 may control the converter 30 on the basis of the divided load region.

In an embodiment, the first region may be a low load region having a relatively low load and the second region may be a medium/high load region having a relatively high load.

In the medium/high load region, an output current and an output voltage of the fuel cell 10 are in inverse proportion to each other according to an I-V performance curve. In other words, in the medium/high load region, as the output current of the fuel cell 10 increases, the output voltage decreases.

In addition, in the medium/high load region, as the output current increases, an output power, which is the product of the output voltage and the output current, increases.

However, in order to solve a problem that durability of the fuel cell 10 decreases as the voltage of the fuel cell 10 increases in the low load region, even though the output current of the fuel cell 10 is varied, the output voltage of the fuel cell 10 may be maintained at a preset voltage.

In addition, in the low load region, as the output current increases, the output voltage is constant and the output power, which is the product of the output voltage and the output current, increases.

The voltage controller 50 may control the output voltage of the fuel cell 10 through the converter 30 on the basis of the first region and the second region.

Specifically, the voltage controller 50 may maintain the output voltage of the fuel cell 10 at a preset voltage in the first region where the load is relatively low.

The fuel cell stack 10 should not be exposed to a high potential in order to prevent corrosion of an electrolyte membrane and carbon corrosion of an electrode by a radical. Here, the preset voltage may be preset to a voltage at which the durability of the fuel cell 10 is not deteriorated. For example, the preset voltage may be an output voltage of the fuel cell 10 of which a voltage (V) of a unit cell is about 0.8 V.

Therefore, the durability of the fuel cell 10 may be improved by controlling the output voltage of the fuel cell 10 to be maintained rather than being increased in a region where the output power of the fuel cell 10 is a low load.

The voltage controller 50 may perform proportional integral control on the output voltage of the fuel cell 10 so that the output power of the fuel cell 10 follows the required power on the basis of a difference between the required power and the output power of the fuel cell 10 in the second region where the load is relatively high.

Specifically, the voltage controller 50 may control the output voltage so that the output power of the fuel cell 10 corresponding to the output voltage of the fuel cell 10 in a one-to-one manner follows the required power on the basis of a difference (required power−output power) between the received required power of the fuel cell 10 required to be output and the output power of the fuel cell 10 currently output from the fuel cell 10.

Figure 3:
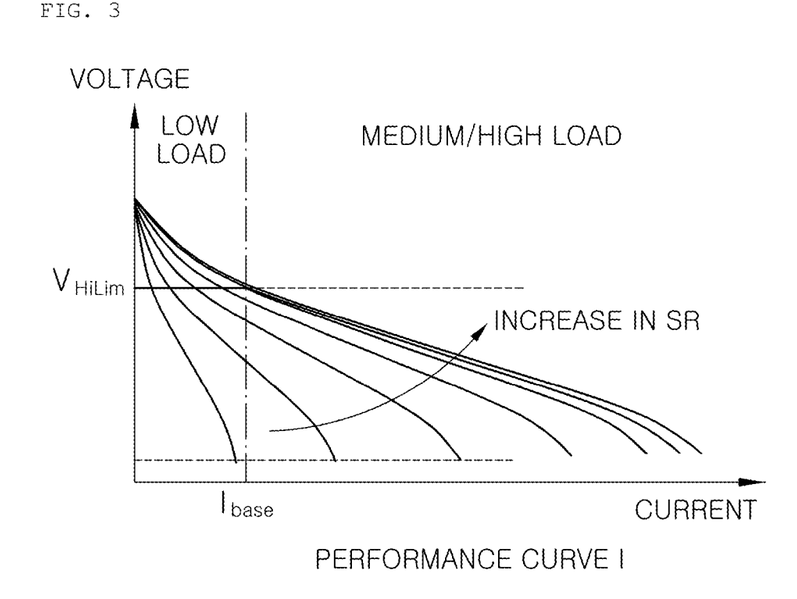
FIG. 3 is a graph illustrating performance curves I-V of the fuel cell according to a ratio of an amount of supplied air to an amount of reacting air in the fuel cell according to an embodiment of the present disclosure.

FIG. 3 is a view illustrating performance curves I-V of the fuel cell 10 according to a ratio of an amount of supplied air to an amount of reacting air in the fuel cell 10 according to an embodiment of the present disclosure.

Further referring to FIG. 3, the supply controller 60 may divide a load region of the fuel cell 10 into a first region and a second region on the basis of the output voltage of the fuel cell 10 and may control the supply device 40 on the basis of the divided load region.

The ratio of the amount of supplied air to the amount of reacting air in the fuel cell 10 refers to a stoichiometry ratio (SR). In other words, the amount of supplied air may be supplied by a ratio corresponding to the SR of an air amount corresponding to the output power or current of the fuel cell 10.

In general, the ratio of the amount of air supplied to the amount of reacting air in the fuel cell 10 may be varied from 0 to 2.3 depending on performance characteristics of the fuel cell 10.

The supply controller 60 may perform proportional integral control on the amount of supplied air so that the output current of the fuel cell 10 follows the required current on the basis of a difference between the required current and the output current of the fuel cell 10 in the first region where the load is relatively low.

In the low load region, the output voltage of the fuel cell 10 may be maintained at the preset voltage. Therefore, in order to adjust the output current and the output power of the fuel cell 10, the ratio SR of the amount of supplied air to the amount of reacting air in the fuel cell 10, corresponding to the output current in a one-to-one manner may be varied. In an embodiment, the proportional integral control may be performed on the amount of supplied air so that the output current of the fuel cell 10 follows the required current.

In an embodiment, as illustrated in FIG. 3, as the ratio SR of the amount of supplied air to the amount of reacting air in the fuel cell 10 increases, a voltage according to the same output current may increase and accordingly, the output power may also increase.

Accordingly, the supply controller 60 may control the supply device 40 so that the ratio of the amount of supplied air to the amount of reacting air in the fuel cell 10 decreases as the required current decreases in the first region where the load is relatively low.

The supply controller 60 may maintain the ratio of the amount of supplied air to the amount of reacting air in the fuel cell 10 in a preset ratio in the second region where the load is relatively high.

The supply controller 60 may maintain the ratio of the amount of supplied air to the amount of reacting air in the fuel cell 10 in the preset ratio in order to maximize power generation performance of the fuel cell 10 in the second region. The preset ratio may be preset in a range in which durability of the fuel cell 10 is maintained while the power generation performance of the fuel cell 10 is increased.

In addition, in a case where the required power or current of the fuel cell 10 required to be output is increased (when the load is increased), the supply controller 60 may delay an air supply time by relatively slowly increasing the preset ratio SR of the amount of supplied air to the amount of reacting air in the fuel cell 10 (setting a time constant to be large).

To the contrary, in a case where the required power or current of the fuel cell 10 required to be output is decreased (when the load is decreased), the supply controller 60 may secure the supply of the air by relatively quickly increasing the preset ratio SR of the amount of supplied air to the amount of reacting air in the fuel cell 10 (setting a time constant to be small).

Additionally, the voltage controller 50 or the supply controller 60 may reset an integral value according to a difference between the required power and the output power of the fuel cell 10 or a difference between the required current and the output current of the fuel cell 10 at the time of a transition of the load region.

Therefore, a phenomenon in which an error occurs in the output voltage of the fuel cell 10 or the preset ratio SR of the amount of supplied air to the amount of reacting air in the fuel cell 10 may be prevented. Such a phenomenon is caused by an unnecessary integral value at the time of the transition of the load region (for example, at the time of a transition from the low load to the medium/high load or at the time of a transition from the medium/high load to the low load).

Additionally, the voltage controller 50 or the supply controller 60 may further include anti-windup control for preventing wind-up by an integral control.

Figure 4:
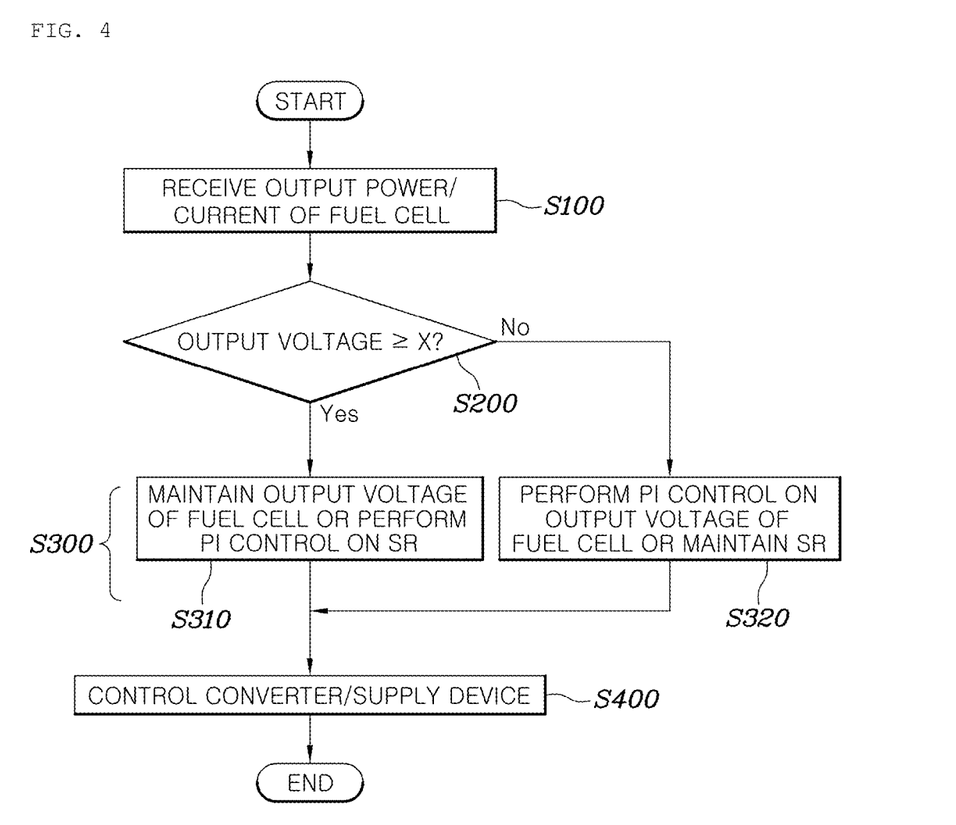
FIGS. 4 and 5 are flowcharts illustrating a power generation control method of a fuel cell according to an embodiment of the present disclosure.
Figure 5:
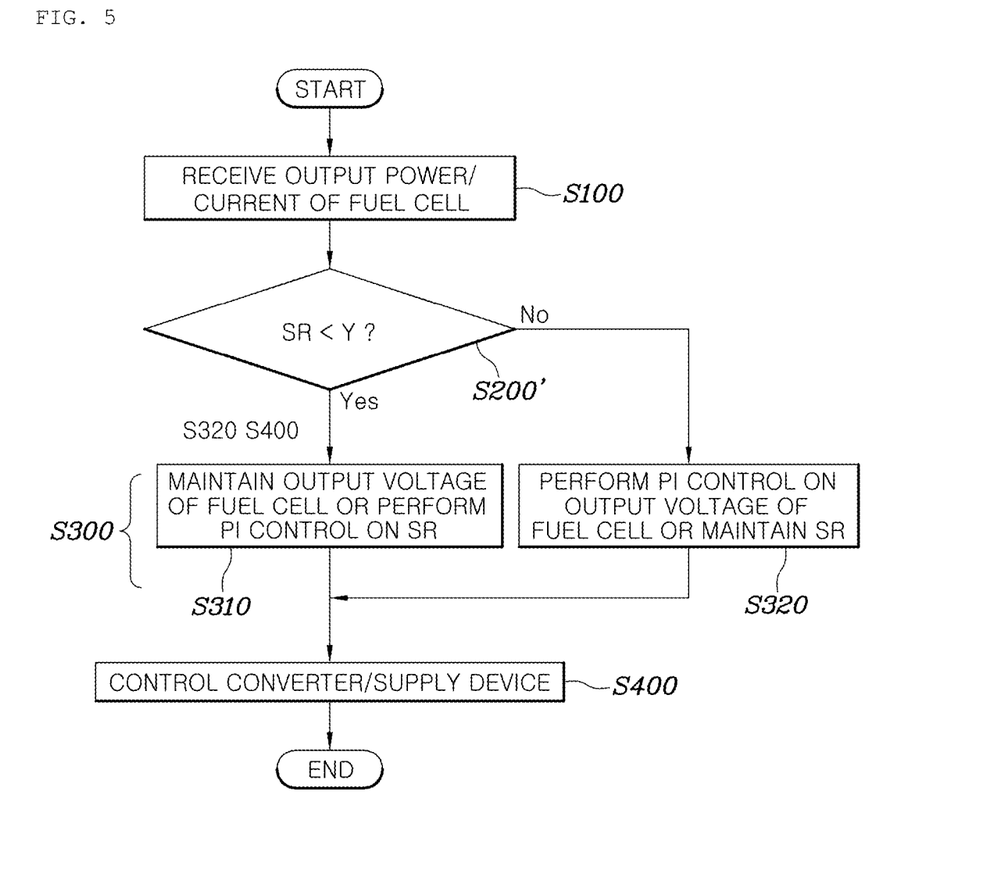

FIGS. 4 and 5 are flowcharts illustrating a power generation control method of a fuel cell 10 according to an embodiment of the present disclosure.

Further referring to FIGS. 4 and 5, the power generation control method of a fuel cell 10 according to an embodiment of the present disclosure includes receiving the required power or current of the fuel cell 10 required to be output (S100). The method also includes setting the output voltage of the fuel cell 10 or the amount of air supplied to the fuel cell 10 on the basis of the received required power or current (S300). The method also includes controlling the converter 30 connected between the fuel cell 10 and the consuming device 20 in series or parallel on the basis of the set output voltage of the fuel cell 10 or controlling the supply device 40 supplying the air to the fuel cell 10 on the basis of the set amount of supplied air (S400).

The power generation control method of a fuel cell 10 according to an embodiment of the present disclosure may further include, before the setting (S300) of the output voltage of the fuel cell 10 or the amount of air supplied to the fuel cell 10, dividing the load region of the fuel cell 10 into the first region and the second region on the basis of the output voltage of the fuel cell 10 or the ratio of the amount of supplied air to the amount of reacting air in the fuel cell 10 (S200 or S200'). In the setting of the output voltage of the fuel cell 10 or the amount of air supplied to the fuel cell 10, the output voltage of the fuel cell 10 or the amount of air supplied to the fuel cell 10 is set on the basis of the divided load region.

The setting (S300) of the output voltage of the fuel cell 10 or the amount of air supplied to the fuel cell 10 may include maintaining the output voltage of the fuel cell 10 at a preset voltage in the first region where the load is relatively low (S310). The setting (S300) may also include setting the output voltage of the fuel cell 10 by performing proportional integral (PI) control on the output voltage of the fuel cell 10 so that the output power of the fuel cell 10 follows the required power on the basis of the difference between the required power and the output power of the fuel cell 10 in the second region where the load is relatively high (S320).

The setting (S300) of the output voltage of the fuel cell 10 or the amount of air supplied to the fuel cell 10 may include performing proportional integral (PI) control on the amount of supplied air so that the output current of the fuel cell 10 follows the required current on the basis of the difference between the required current and the output current of the fuel cell 10 in the first region where the load is relatively low (S310). The setting (S300) may also include setting the amount of supplied air so that the ratio of the amount of supplied air to the amount of reacting air in the fuel cell 10 decreases as the required current decreases in the first region where the load is relatively low (S320).

In the setting (S300) of the output voltage of the fuel cell 10 or the amount of air supplied to the fuel cell 10, the integral value according to the difference between the required power and the output power of the fuel cell 10 or the difference between the required current and the output current of the fuel cell 10 at the time of the transition of the load region may be reset.

Figure 6:
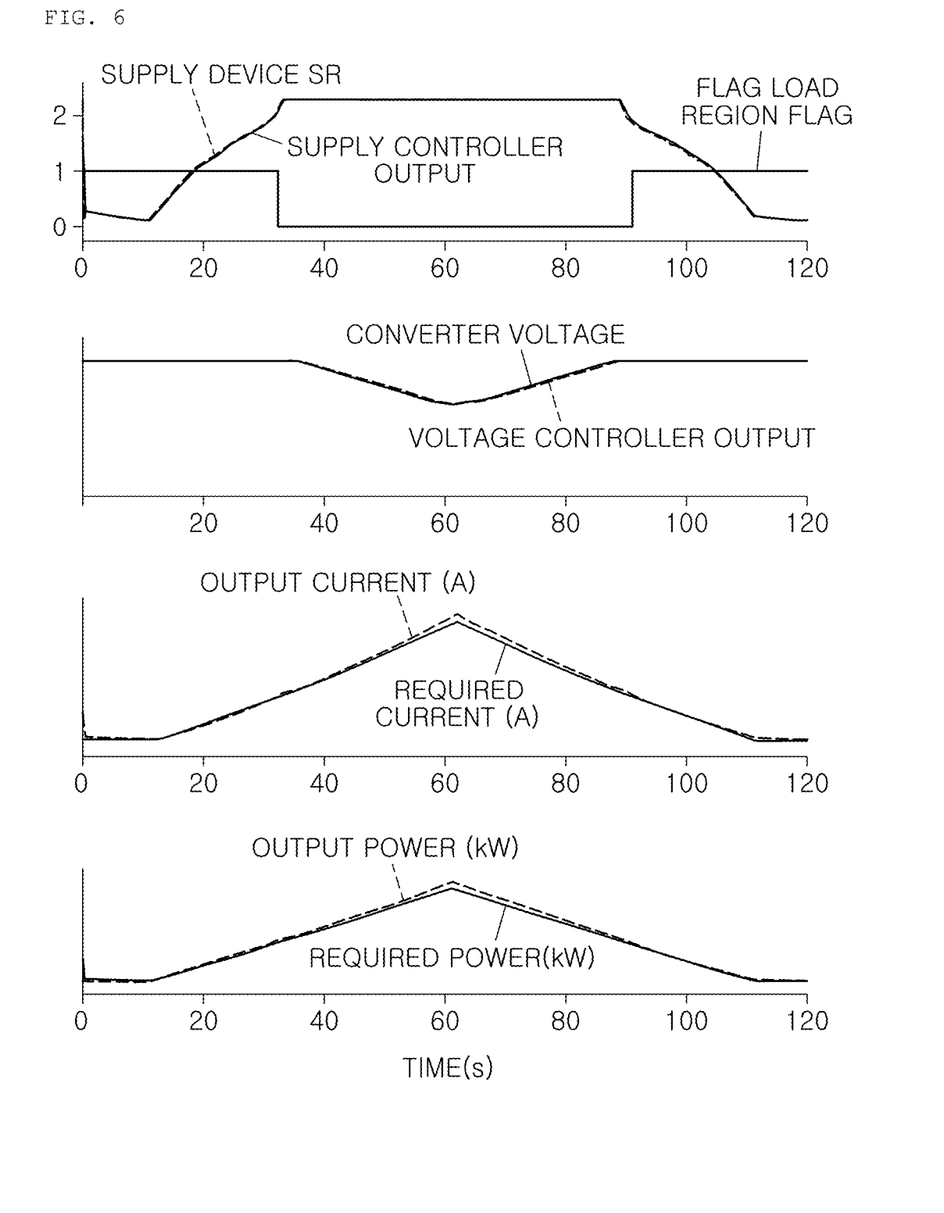
FIG. 6 are graphs illustrating control results by the power generation control system and method of a fuel cell according to an embodiment of the present disclosure.

FIG. 6 are graphs illustrating control results by the power generation control system and method of a fuel cell 10 according to an embodiment of the present disclosure.

Further referring to FIG. 6, it may be confirmed that the output power and current of the fuel cell 10 follow the required power and current by controlling the preset ratio (SR) of the amount of supplied air to the amount of reacting air in the fuel cell 10 in the low load region.

In an embodiment, it may be confirmed that the output voltage, current, and power of the fuel cell 10 follow the required voltage, current, and power, respectively, while the load region in which the fuel cell 10 is operated is varied with a constant inclination.

In addition, it may be confirmed that control stability of the output voltage, current, and power of the fuel cell 10 is secured even in a section in which the load region in which the fuel cell 10 is operated is transitioned (sections in which the load region is transitioned from the low load to the medium/high load and is transmitted from the medium/high load to the low load).

With the power generation control system and method of a fuel cell according to the present disclosure, the power generation of the fuel cell is controlled according to the required power or current of the fuel cell required to be output. Also, the excessive supply of the air to the fuel cell is prevented and the voltage of the fuel cell is maintained to improve the durability of the fuel cell.

Although the present disclosure has been shown and described with respect to specific embodiments, it should be apparent to those having ordinary skill in the art that the present disclosure may be variously modified and altered without departing from the spirit and scope of the present disclosure as defined by the following claims.

What is claimed is:

1. A power generation control system of a fuel cell, the system comprising:
   the fuel cell configured to generate power through a chemical reaction between fuel and air;
   a consuming device connected to an output terminal of the fuel cell and configured to consume the power output from the fuel cell;
   a converter connected between the fuel cell and the consuming device in series or parallel and configured to adjust an output voltage of the fuel cell;
   a supply device configured to supply the air to the fuel cell;
   a voltage controller configured to control the converter on the basis of a required power or current of the fuel cell required to be output; and
   a supply controller configured to control the supply device on the basis of the required power or current of the fuel cell required to be output,
   wherein the voltage controller is configured to divide a load region of the fuel cell into a first region and a second region on the basis of a ratio of an amount of supplied air to an amount of reacting air in the fuel cell and control the converter on the basis of the divided load region.

2. The system of claim 1, further comprising a battery connected between the fuel cell and the consuming device in parallel on a side opposite to the fuel cell with respect to the converter, the battery configured to be charged with the power generated by the fuel cell or assist the power generated by the fuel cell while being discharged.

3. The system of claim 1, wherein the voltage controller is configured to maintain the output voltage of the fuel cell at a preset voltage in the first region in which a load is lower than the second region.

4. The system of claim 1, wherein the voltage controller is configured to perform proportional integral control on the output voltage of the fuel cell so that an output power of the fuel cell follows the required power on the basis of a difference between the required power and the output power of the fuel cell in the second region where a load is higher than the first region.

5. The system of claim 4, wherein the voltage controller or the supply controller is configured to reset an integral value according to the difference between the required power and the output power of the fuel cell or a difference between the required current and the output current of the fuel cell at the time of a transition of the load region.

6. A power generation control system of a fuel cell, the system comprising:
   the fuel cell configured to generate power through a chemical reaction between fuel and air;
   a consuming device connected to an output terminal of the fuel cell and configured to consume the power output from the fuel cell;
   a converter connected between the fuel cell and the consuming device in series or parallel and configured to adjust an output voltage of the fuel cell;
   a supply device configured to supply the air to the fuel cell;
   a voltage controller configured to control the converter on the basis of a required power or current of the fuel cell required to be output; and
   a supply controller configured to control the supply device on the basis of the required power or current of the fuel cell required to be output,
   wherein the supply controller is configured to divide a load region of the fuel cell into a first region and a second region on the basis of the output voltage of the fuel cell and control the supply device on the basis of the divided load region.

7. The system of claim 6, wherein the supply controller is configured to perform proportional integral control on an amount of supplied air so that an output current of the fuel cell follows the required current on the basis of a difference between the required current and the output current of the fuel cell in the first region where a load is lower than the second region.

8. The system of claim 7, wherein the voltage controller or the supply controller is configured to reset an integral value according to the difference between the required power and an output power of the fuel cell or a difference between the required current and the output current of the fuel cell at the time of a transition of the load region.

9. The system of claim 6, wherein the supply controller is configured to control the supply device so that a ratio of an amount of supplied air to an amount of reacting air in the fuel cell decreases as the required current decreases in the first region in which a load is lower than the second region.

10. The system of claim 6, wherein the supply controller is configured to maintain a ratio of an amount of supplied air to an amount of reacting air in the fuel cell in a preset ratio in the second region where a load is higher than the first region.

11. A power generation control method of a fuel cell, the method comprising:
   receiving a required power or current of the fuel cell required to be output;
   setting an output voltage of the fuel cell or an amount of air supplied to the fuel cell on the basis of the received required power or current;
   controlling a converter connected between the fuel cell and a consuming device in series or parallel on the basis of the set output voltage of the fuel cell or controlling a supply device supplying the air to the fuel cell on the basis of the set amount of supplied air; and
   before the setting of the output voltage of the fuel cell or the amount of air supplied to the fuel cell, dividing a load region into a first region and a second region on the basis of the output voltage of the fuel cell or a ratio of the amount of supplied air to an amount of reacting air in the fuel cell,
   wherein, in the setting of the output voltage of the fuel cell or the amount of air supplied to the fuel cell, the output voltage of the fuel cell or the amount of air supplied to the fuel cell is set on the basis of the divided load region.

12. The method of claim 11, wherein the setting of the output voltage of the fuel cell or the amount of air supplied to the fuel cell includes:
   maintaining the output voltage of the fuel cell at a preset voltage in the first region where a load is lower than the second region; and
   setting the output voltage of the fuel cell by performing proportional integral control on the output voltage of the fuel cell so that an output power of the fuel cell follows the required power on the basis of a difference between the required power and the output power of the fuel cell in the second region where the load is higher than the first region.

13. The method of claim 11, wherein the setting of the output voltage of the fuel cell or the amount of air supplied to the fuel cell includes:
   performing proportional integral control on the amount of supplied air so that an output current of the fuel cell follows the required current on the basis of a difference between the required current and the output current of the fuel cell in the first region where a load is lower than the second region; and
   setting the amount of supplied air so that the ratio of the amount of supplied air to an amount of reacting air in the fuel cell decreases as the required current decreases in the first region where the load is lower than the second region.

14. The method of claim 11, wherein, in the setting of the output voltage of the fuel cell or the amount of air supplied to the fuel cell, an integral value according to a difference between the required power and an output power of the fuel cell or a difference between the required current and an output current of the fuel cell at the time of a transition of the load region is reset.

* * * * *